United States Patent [19]

Kagawa et al.

[11] Patent Number: 4,510,217
[45] Date of Patent: Apr. 9, 1985

[54] SODIUM-SULFUR STORAGE BATTERY

[75] Inventors: Hiroshi Kagawa; Kazumasa Matsui, both of Takatsuki, Japan

[73] Assignee: Yuasa Battery Co. Ltd., Osaka, Japan

[21] Appl. No.: 530,240

[22] Filed: Sep. 8, 1983

[30] Foreign Application Priority Data

Sep. 17, 1982 [JP] Japan .............................. 57-162961

[51] Int. Cl.³ ................................. H01M 4/36
[52] U.S. Cl. ................................. 429/104; 429/112; 429/193
[58] Field of Search ................. 429/104, 112, 193

[56] References Cited

U.S. PATENT DOCUMENTS

| 4,102,042 | 7/1978 | Weiner | 429/104 |
| 4,204,035 | 5/1980 | King | 429/104 |
| 4,206,272 | 6/1980 | Fischer et al. | 429/104 |
| 4,246,325 | 1/1981 | Hatch | 429/104 |
| 4,413,043 | 11/1983 | Steinleitner et al. | 429/104 |

Primary Examiner—Charles F. LeFevour
Attorney, Agent, or Firm—Armstrong, Nikaido, Marmelstein & Kubovcik

[57] ABSTRACT

The present invention discloses a sodium-sulfur storage battery utilizing an inside of a sodium-ion conductive solid electrolyte tube as a negative chamber, comprising an α-alumina ring jointed with solder glass to an open end of said electrolyte tube, a flanged aluminum housing having a fine hole at its bottom incorporated in said solid electrolyte tube, a negative auxiliary cover thermo-compressively jointed through a flange of said aluminum housing to an upper surface of said α-alumina ring, and a negative cover provided with a negative current collector terminal welded to said negative auxiliary cover.

3 Claims, 4 Drawing Figures

SODIUM-SULFUR STORAGE BATTERY

BACKGROUND OF THE INVENTION

This invention relates to a construction of a negative chamber for a storage battery of the sodium-sulfur type, and is especially intended to simplify manufacturing of storage batteries and provide improved, utilization of sodium, more uniform electric current distribution on the solid electrolyte tube surface, and safety.

The sodium-sulfur storage battery is a high-temperature type secondary battery in which sodium as a negative reactant and sulfur as a positive reactant are separated by a $\beta''$-alumina as a sodium-ion conductive solid electrolyte tube, and are actuated at a temperature of 300°–350° C. A vertical sectional view of a conventional sodium-sulfur storage battery is shown in FIG. 1, and operating conditions and problems to be considered will be described hereunder according to FIG. 1. 1 is a $\beta''$-alumina as a solid electrolyte tube. 2 is an $\alpha$-alumina ring to which an upper open part of the solid electrolyte tube 1 is jointed with solder glass. 3 is stainless steel fiber. 4 is sodium as a negative reactant impregnated in the stainlss fiber 3. 5 is a negative current collector terminal which vacuously impregnates the negative reactant and functions also as a current collector. 6 is a negative cover comprising stainless steel, and the negative current collector terminal is welded to a central part thereof. 7 is a negative auxiliary cover comprising such as stainless steel, iron, Fe-Cr-Al alloy etc. 8, 9 are aluminum rings. 10 is a battery housing comprising metal which has sufficient resistance to chemical and electrochemical attack by molten sulfur and sodium polysulfide such as, for example: stainless steel, Fe-25Cr-4Al, Fe-Cr-Al-Y alloy, chrome diffusion processed stainless steel etc; and functioning also as a positive current collector. The negative auxiliary cover 7 and the battery housing 10 are thermocompressively jointed respectively through the aluminum ring 8 and the aluminum ring 9 to an upper and lower faces of the $\alpha$-alumina ring 2 to which the solid electrolyte tube 1 is jointed with solder glass. After completion of the thermocompression jointing work, the stainless steel fiber 3 is filled in the solid electrolyte tube 1, the negative cover 6 welded with the negative current collector terminal 5 is inserted therein, then the negative cover 6 and the negative auxiliary cover 7 are welded together. After the above-mentioned component body is heated up to about 150° C., molten sodium of constant quantity is vacuously impregnated through the negative current collector terminal, then the negative current collector terminal is vacuously sealed. 11 is sulfur as a positive reactant. 12 is a positive electroconductive material, which comprises fiber such as graphite, corbon etc., impregnated with the positive reactant 11, and inserted from the bottom of the battery housing 10. A bottom cover 13 is fitted to the battery housing and welded thereto under inert gas atmosphere or vacuum. A primary problem to be considered at a manufacturing stage of the above-mentioned conventional sodium-sulfur storage battery is unevenness of filling density of the stainless fiber to be filled in the solid electrolyte tube 1 and hardness of filling work thereof. A secondary problem is heat cycle applied on the solid electrolyte tube 1 due to necessary heating of the component body including the solid electrolyte tube 1 up to above the melting point of sodium, and influence on productivity caused by times required for rising and lowering temperature, when the negative reactant is filled. Now problems, which will arise when a storage battery manufactured as shown in FIG. 1 is heated and galvanized, will be discussed here under.

The first problem is uneven wetting of sodium on the inside surface of the solid electrolyte tube 1 accompanied by a decrease of sodium in the stainless steel fiber 3 when discharging. This phenomenon is attributable to a suction effect due to the fact that capillarity of the stainless steel fiber lessens with a decrease in a quantity of sodium to produce unwetted portions which may cause breakage of the solid electrolyte tube 1 due to uneven current density generated therein. Secondarily, when the solid electrolyte tube 1 is broken due to the above-mentioned reason, or when it is broken by being applied with mechanical shock etc., sodium reacts directly with sulfur or sodium polysulfide 11 to generate a large amount of heat and melt the battery housing 10, thus even an adjacent storage battery would be broken. The third one is a reduction in the utilization factor of sodium due to a decrease in discharge capacity caused by the above-mentioned first problem, and lessening of the quantity of sodium available for reaction as compared with the quantity of sodium remaining in the solid electrolyte tube 1.

An object of this invention is to overcome the above-mentioned problems, i.e. to simplify the manufacturing of a storage battery, to improve the utilization factor of sodium, to improve service life of the battery by uniformalizing distribution of current on the surface of the solid electrolyte tube, and to improve safety by preventing the battery housing from being broken even in case of breakage of the battery itself.

DETAILED DESCRIPTION OF THE PREFERRED EMBODIMENTS

Figure 1:
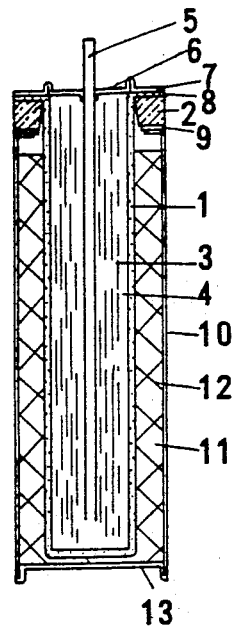
FIG. 1 is a vertical sectional view of a conventional sodium-sulfur storage battery.
Figure 2:
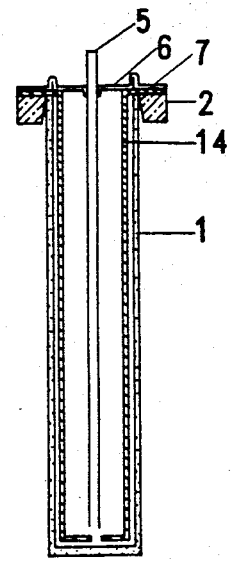
FIG. 2 is a vertical sectional view of a negative electrode of this invention.

An example of structure of this invention is shown in FIG. 2. 14 is a flanged aluminum housing of this invention and has a fine bottom hole as a sodium passage. An upper flange of the aluminum housing 14 is disposed on an upper surface of the $\alpha$-alumina ring 2, interposed between it and the negative auxiliary cover 7. Said flange connects $\alpha$-alumina ring 2 and the negative auxiliary cover 7 by means of thermocompressive jointing. Similarily battery housing 10 is connected with aluminum ring 9 to a lower surface of the $\alpha$-alumina ring 2 by thermocompressive jointing, but this is not specially illustrated in the figure. In order to fill the negative reactant 4 in the structure of this invention, the inside of the solid electrolyte tube 1 is evacuated under, for instance, an atmosphere of argon gas, a prescribed amount of molten sodium is vacuously impregnated therein through the negative current collector terminal 5; then the negative current collector terminal 5 is opened to the atmosphere of argon gas to permit argon gas to flow into the aluminum housing 14, and the negative current collector terminal 5 is sealed. Upon cooling, sodium fills a space between the solid electrolyte tube 1 and the aluminum housing 14 and in the aluminum housing 14, and argon gas is fills an upper space of the aluminum housing 14. When the thusly assembled body is heated up to a battery operating temperature and discharged after its positive electrode has been assembled conventionally, the sodium in the aluminum housing 14 passes through the bottom fine hole to be fed to said space as the molten sodium in said space passes through the solid electrolyte tube 1 to the positive electrode side. Incidentally, a vacuum is created in said space due to consumption of sodium in said space, while the upper space of the aluminum housing 14 is filled with argon gas of low pressure and a capillary effect occurs in said space so that said sodium can move smoothly into the space between tube 1 and housing 14. Changes of polarization voltage in this instance of discharge, i.e. when the amount of sodium present in the negative chamber decreases, are shown in the polarization characteristics of FIG. 4. Conventionally, the polarization voltage becomes large with an increase in the amount of galvanizing while there is almost no change thereof in the battery of the present invention. No change in the polarization voltage of such a case indicates that portions lacking sodium on the surface of the solid electrolyte tube 1 do not exist, and this will prolong the service life of the solid electrolyte tube 1.

Figure 3:
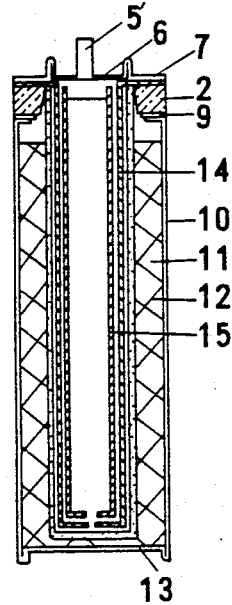
FIG. 3 is a vertical sectional view of the sodium-sulfur storage battery of this invention.

Another example of structure of this invention is shown in FIG. 3. 15 is a metal housing of this invention formed of metal which has sufficient resistance to chemical and electrochemical attack by molten sodium, for example: stainless steel, and having a fine hole as a passage for sodium at the bottom thereof. The negative auxiliary cover 7 and the battery housing 10 are thermocompressively jointed to the top and bottom surfaces of the α-alumina ring 2 through the aluminum housing 14 and the aluminum ring 9 respectively. Then the metal housing 15 filled with a prescribed amount of sodium is inserted in said aluminum housing 14, and the negative current collector terminal 5' and the jointing negative cover 6 are welded thereto to compose the negative electrode. In this instance, sodium may be filled through the negative current collector terminal to the metal housing 15, the aluminum housing 14, and the solid electrolyte tube. In a case aware sodium is filled later, however, it is impossible to eliminate the excessive heat cycle of the solid electrolyte tube 1. When the thusly obtained negative electrode was discharged in sodium, its change of polarization voltage was the same with that shown in FIG. 4. Namely, this means that sodium is continuously delivered from the space between the aluminum housing 14 and the metal housing 15 and from the inside of the metal housing 15 through the fine hole thereof, with a decrease in quantity of sodium in the space between the solid electrolyte tube 1 and the aluminum housing 14. Further, when the storage battery according to this invention as shown in FIG. 3 was broken by cracking the solid electrolyte tube 1 at a battery operating temperature of about 350° C., the battery voltage instantaneously became 0 V and at the same time the battery temperature was held locally at a maximum temperature of about 580° C. for about five minutes, but it decreased to the operating temperature of 350° C. after 40 minutes. As the result of taking the storage battery into pieces at a room temperature, it was found that the aluminum housing 14 was perforated and broken but sodium still remained in the metal housing 15. This resulted from the phenomenon that sodium reacts directly with sulfur at the cracked portion of the solid electrolyte tube 1 and the aluminum housing 14 is partially molten and perforated due to the heat of reaction, so that the space between the solid electrolyte tube 1 and the aluminum housing 14 is interconnected to and becomes equivalent in pressure with the space in the metal housing 15, thus delivery of sodium from the inside of the metal housing 15 to said space is stopped.

As mentioned above, the manufacturing process is facilitated by eliminating the metal fiber according to this invention. Further, the aluminum housing is so constructed as illustrated in the figure as a substitute for the effect of the metal fiber, so that fabrication is simplified simultaneous working of the several components in one thermocompressive jointing operation. Moreover, the utilization factor of sodium can be improved and at the same time the current distribution on the solid electrolyte tube surface can be made uniform for longer service life of the battery by making the polarization voltage stable in case of galvanizing. Furthermore, the maximum temperature of the storage battery can be held below 600° C. for higher safety thereof even when the storage battery breaks.

In order to explain the structure and effect of the invention in detail, embodiments will be described herein below.

Figure 4:
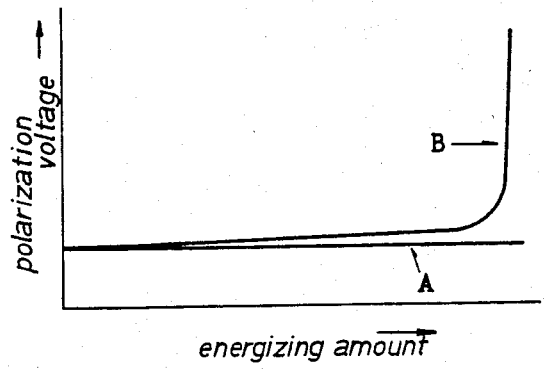
FIG. 4 is a graph of characteristic curves showing changes in polarization voltage.

Embodiment 1:

In the structure as shown in FIG. 2, the α-alumina ring 2 having outside dia. of 50.8 mm, inside dia. of 36.7 mm, and thickness of 8 mm was jointed with solder glass to an open end of the β''-alumina 1 having inside dia. of 31 mm, outside dia. of 36 mm, and length of 300 mm. The aluminum housing 14 having outside dia. of 30 mm, length of 300 mm, thickness of 0.1 mm, and provided with a flange having outside dia. of 50 mm at its upper end, was disposed on an upper surface of the α-alumina ring 2, the negative auxiliary cover 7 comprising a 0.4 mm thick stainless steel was disposed thereon, then they were thermocompressively jointed together. The negative cover 6 was welded, and sodium was filled through the negative current collector terminal 5. The change of polarization voltage at the time when sodium decreased was measured by Na/Na cell at 350° C. and the results as shown in FIG. 4 were obtained. The curve A represents the storage battery according to this invention and the curve B represents a conventional one. After repeated operations of charging and discharging with total amount of 54144 AH for six months, the storage battery was broken up and no abnormality was found in the solid electrolyte tube 1. In a conventional storage battery, however, the polarization voltage lowered after about one month, total amount of about 8050 AH, and it was found after breaking up that fine cracks and numerous black spots appeared on the solid electrolyte tube 1.

Embodiment 2:

After disposing the aluminum housing 14 in the same manner as the embodiment 1, the metal housing 15 made of stainless steel having outside dia. of 29.4 mm, thickness of 0.2 mm, and length of 295 mm, in which sodium of 178 g was filled and solidified, was disposed in said aluminum housing 14. Further, after filling sodium azide of about 0.1 g on an upper surface of said sodium, the negative cover 6 was disposed thereon and it was welded to the negative auxiliary cover 7 under vacuum. In cases where this component body was heated, said sodium in the metal housing 15 was molten and flowed out of the bottom fine hole to fill the inside and outside of the aluminum housing 14. In cases where this was discharged, said sodium in the space between the aluminum housing 14 and the metal housing 15 and in the metal housing 15 was delivered through the fine hole 5 with a decrease in quantity of sodium in the space between the solid electrolyte tube 1 and the aluminum housing 14. The polarization voltage in this case scarcely changed in the same manner as FIG. 4. As the next stage, the storage battery was assembled by composing the positive electrode as shown in FIG. 3. and broken by cracking the solid electrolyte tube 1 at 350° C., but no abnormality was found in the battery housing 10. Incidentally, the surface temperature of the battery housing 10 corresponding to the crack generating portion rose to as high as about 550° C. maximum, but it lowered to the battery operating temperature of 350° C. about 30 minutes later.

As mentioned above, according to this invention, the manufacturing of a storage battery can be improved by utilizing the aluminum housing as a substitute for the conventional metal fiber, and at the same time the manhour requirement in manufacturing can be reduced by means of the simultaneous assembly by means of thermocompressive jointing. In case of the decrease in sodium at the time of discharge, insufficiently wetted portions of sodium are eliminated from the solid electrolyte surface so that the utilization factor of sodium can be increased and the service life thereof can be improved simultaneously. Further, even in case of breakage of the storage battery, the safety of battery can be improved without perforating the battery housing and permitting the reactant to leak therefrom.

In this invention, there are no limitations for the shape of storage battery (for example, shape of α-alumina ring etc.), the shapes other than the flange and the fine hole diameter of the aluminum housing, the shape and the fine hole diameter of the metal housing etc. unless otherwise specified particularly in the claims.

What is claimed is:

1. In a sodium-sulfur storage battery of the type utilizing an inside of a sodium-ion conductive solid electrolyte tube as a negative chamber and having an alpha-alumina ring jointed with solder glass to an upper open end of said solid electrolyte tube and an aluminum housing provided with a flange at its upper end and having a fine hole at its bottom incorporated in said solid electrolyte tube, the improvement comprising a negative auxiliary cover thermocompressively jointed through said flange of said aluminum housing to an upper surface of said alpha-alumina ring, a lower surface of said flange being jointed to an upper surface of said alpha-alumina ring and an upper surface of said flange being jointed to a lower surface of said negative auxiliary cover, and a negative cover provided with a negative current collector terminal welded to said negative auxiliary cover, wherein said aluminum housing is filled with sodium, except that an upper space between said solid electrolyte tube and said aluminum housing is under vacuum or filled with sodium and an upper space inside said aluminum housing is filled with an inert gas.

2. In a sodium-sulfur storage battery of the type utilizing an inside of a sodium-ion conductive solid electrolyte tube as a negative chamber and having an alpha-alumina ring jointed with solder glass to an upper open end of said solid electrolyte tube, and an aluminum housing provided with a flange at its upper end and having a fine hole at its bottom incorporated in said solid electrolyte tube, the improvement comprising a negative auxiliary cover thermocompressively jointed through said flange of said aluminum housing to an upper surface of said alpha-alumina ring, a lower surface of said flange being jointed to an upper surface of said alpha-alumina ring and an upper surface of said flange being jointed to a lower surface of said negative auxiliary cover, a metal housing, resistant to chemical and electrochemical attack by molten sodium and provided with a fine hole at its bottom, incorporated in said aluminum housing in spaced relation therewith, and a negative cover provided with a negative current collector terminal welded to said negative auxiliary cover, wherein said metal housing, a space between said metal housing and said aluminum housing and a space between said aluminum housing and said solid electrolyte tube are all filled with sodium, such that under battery operating conditions as the quantity of sodium in said space between said aluminum housing and said solid electrolyte tube decreases sodium is continuously delivered from said space between said aluminum housing and said metal housing through said fine hole in said aluminum housing and also from inside said metal housing through said fine hole therein to said space between said aluminum housing and said solid electrolyte tube.

3. A sodium-sulfur storage battery as set forth in claim 2, wherein sodium is filled, under a battery operating temperature, into said space between said aluminum housing and said solid electrolyte tube, into said space between said aluminum housing and said metal housing, and into said metal housing, and at the same time inert gas is filled into an upper space inside said aluminum housing and an upper space inside said metal housing such that said negative chamber is completely filled with sodium except for said upper spaces inside said aluminum housing and metal housing filled with inert gas.

* * * * *